United States Patent
Kulkarni et al.

(10) Patent No.: US 11,698,745 B2
(45) Date of Patent: Jul. 11, 2023

(54) PRE-ERASURE OF MEMORY IN STORAGE DEVICES

(71) Applicant: Western Digital Technologies, Inc., San Jose, CA (US)

(72) Inventors: Shrinidhi Kulkarni, Milpitas, CA (US); Vinayak Bhat, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 39 days.

(21) Appl. No.: 17/222,459

(22) Filed: Apr. 5, 2021

(65) Prior Publication Data

US 2022/0317914 A1  Oct. 6, 2022

(51) Int. Cl.
*G06F 3/06* (2006.01)

(52) U.S. Cl.
CPC ............ *G06F 3/0652* (2013.01); *G06F 3/064* (2013.01); *G06F 3/0611* (2013.01); *G06F 3/0659* (2013.01); *G06F 3/0679* (2013.01)

(58) Field of Classification Search
CPC ...... G06F 3/0611; G06F 3/064; G06F 3/0652; G06F 3/0659; G06F 3/0679; G06F 3/061; G06F 12/0246
See application file for complete search history.

(56) References Cited

U.S. PATENT DOCUMENTS

| | | | |
|---|---|---|---|
| 6,977,847 B2 | 12/2005 | Lasser et al. | |
| 9,037,777 B2 | 5/2015 | Sabbag | |
| 9,342,260 B2 | 5/2016 | Schuette et al. | |
| 10,658,045 B1 | 5/2020 | Yang et al. | |
| 10,739,996 B1 * | 8/2020 | Ebsen | G06F 16/1727 |
| 2012/0084484 A1 * | 4/2012 | Post | G06F 12/0246 710/308 |
| 2012/0239851 A1 * | 9/2012 | Calvert | G06F 3/0688 711/E12.001 |
| 2012/0239853 A1 | 9/2012 | Moshayedi | |
| 2014/0215129 A1 | 7/2014 | Kuzmin et al. | |
| 2015/0143068 A1 | 5/2015 | Higgins et al. | |
| 2018/0081543 A1 * | 3/2018 | Muchherla | G06F 3/0653 |
| 2019/0220219 A1 | 7/2019 | Um | |
| 2020/0350025 A1 | 11/2020 | Purahmad et al. | |

OTHER PUBLICATIONS

International Search Report and Written Opinion, PCT Application No. PCT/US2022/015811, dated Jun. 2, 2022.

* cited by examiner

*Primary Examiner* — Larry T Mackall
(74) *Attorney, Agent, or Firm* — Ravi Mohan; Rutan & Tucker, LLP

(57) ABSTRACT

Storage devices include a memory array comprised of a plurality of memory devices. These memory devices are programmed to store data and erased when data is invalidated. Traditional storage devices waited to erase memory devices until new data was ready to write to them in order to avoid baking in the erase state. However, the act of erasing adds time to the overall program cycle and is getting larger as storage device capacity and complexity increases. Because of newer configurations, the threat of baking in erase states is decreased, allowing memory devices within a memory array to be pre-erased prior to writing. This reduces write times and be dynamically implemented in response to one or more changing conditions. Pre-erasing can be accomplished by utilizing a pre-erase list that can indicate pre-erased memory devices and provide them in response to a write command prior to the use of non-erased memory devices.

13 Claims, 8 Drawing Sheets

PRE-ERASURE OF MEMORY IN STORAGE DEVICES

FIELD

The present disclosure relates to storage systems. More particularly, the present disclosure relates to pre-erasing memory blocks and metablocks within storage devices to improve write times and improve overall performance.

BACKGROUND

Storage devices are ubiquitous within computing systems. Solid-state storage devices have become increasingly common. These nonvolatile storage devices can communicate and utilize various protocols including non-volatile memory express (NVMe), and peripheral component interconnect express (PCIe) to reduce processing overhead and increase efficiency.

Solid-state storage devices include an array of memory devices that can be programmed to store a certain voltage threshold associated with one or more bits of data. The memory devices can be programmed to a different voltage by first performing an erase method before reprogramming the memory device to a new voltage. In traditional storage devices, memory devices are kept in a programmed state, even after the data stored within was invalidated. This was done in certain cases to avoid baking in an erase state which would lead to problems reading data written to memory devices after they were in a prolonged erase state. Thus, many storage devices would only erase a memory device or other memory structure within a memory array when it was time to write new data.

However, erasing a memory device takes a non-trivial amount of time to accomplish. In some storage devices, the memory devices, erasing the memory devices prior to writing may account for seven to ten percent of the total programming time. As memory arrays become larger and more complex, these erase times can increase even to an even larger proportion of the program cycle. Additionally, for storage devices that are configured for use in highly demanding deployments, the extra time required to erase memory devices can make it more difficult for the storage device to operate within the required specifications.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
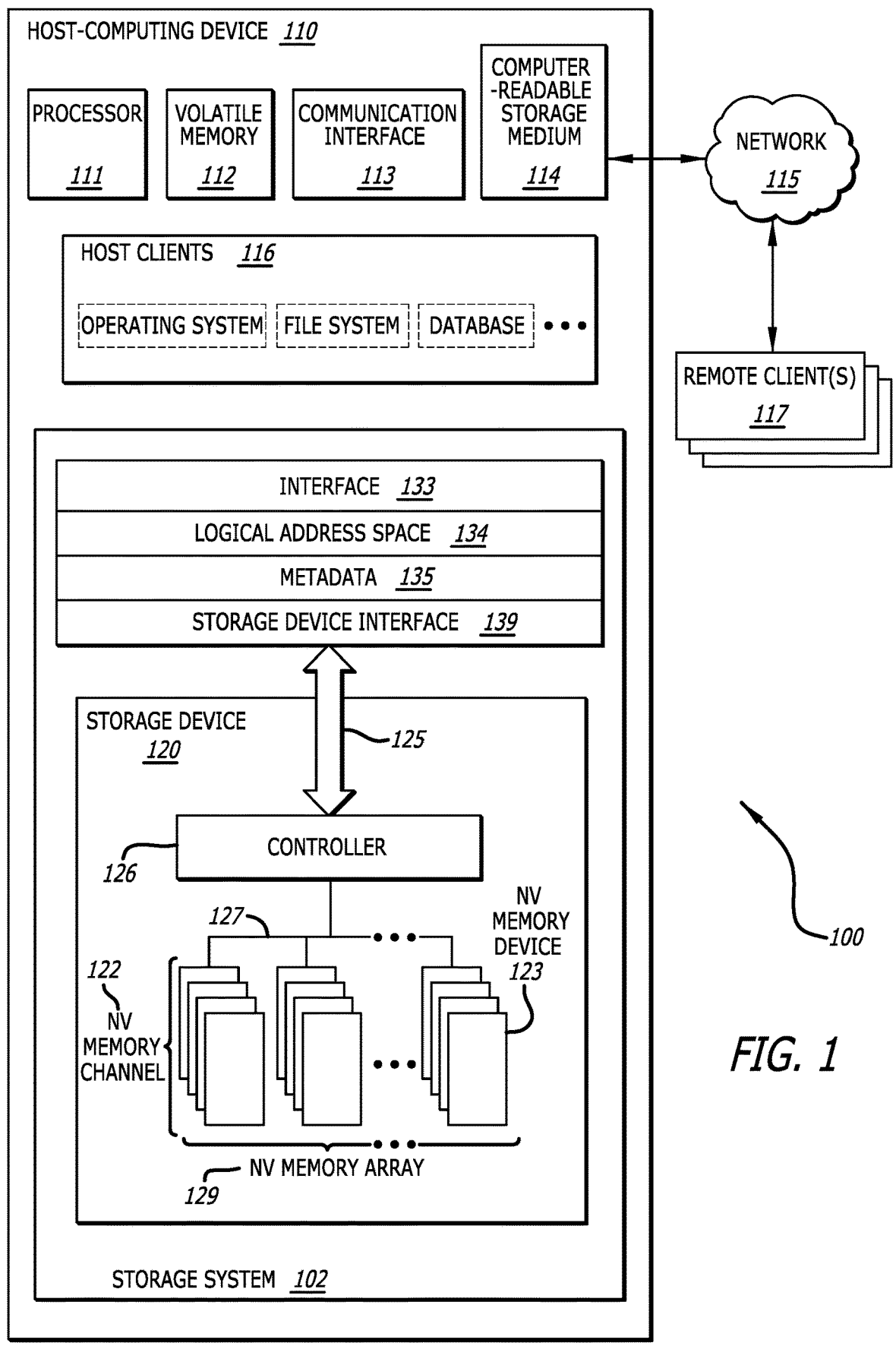
FIG. 1 is schematic block diagram of a host-computing device with a storage device suitable for pre-erase list usage in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that utilize a pre-erasure list to facilitate pre-erasure of one or more memory devices within a memory array prior to programming. In many embodiments, storage devices configured for pre-erasure of memory devices will process invalidated memory blocks from a free block list and erase them before assigning them from a pre-erase list. Subsequently, when a request to write data to the storage device is received, the storage device will provide memory device assigned to the pre-erase list first which will yield faster write times than memory devices assigned to the free block list.

In a number of embodiments, the storage device will have a plurality of hybrid memory devices within the memory array that can be programmed to act as a number of different types of memory levels (i.e., densities). The hybrid memory devices can often be processed to be pre-erased prior to writing. In this way, a portion of the memory array can be configured to act as a higher speed portion to capture newly written data from the host which can later be copied (i.e., "folded") into the relatively slower portions of the memory array. In a variety of embodiments, the storage device may configure the hybrid memory devices with pre-erasure to act as an overflow for a faster configured single level cell (SLC) memory portion.

Additionally, devices and methods described herein can also be configured to handle ungraceful shutdowns (UGSDs) which occur when power is suddenly and unexpectedly lost to the storage device during operation. Because of the nature of many lists or other variable states within the storage device, having memory devices that are not fully processed can become problematic. Thus, in some embodiments described herein, UGSDs can be handled within pre-erasure configured storage devices by performing a variety of scans on affected memory devices. These specific methods and operations are described in more detail below.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device 110 with a storage system 102 suitable for pre-erase list usage in accordance with an embodiment of the disclosure is shown. The control block management system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device (s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
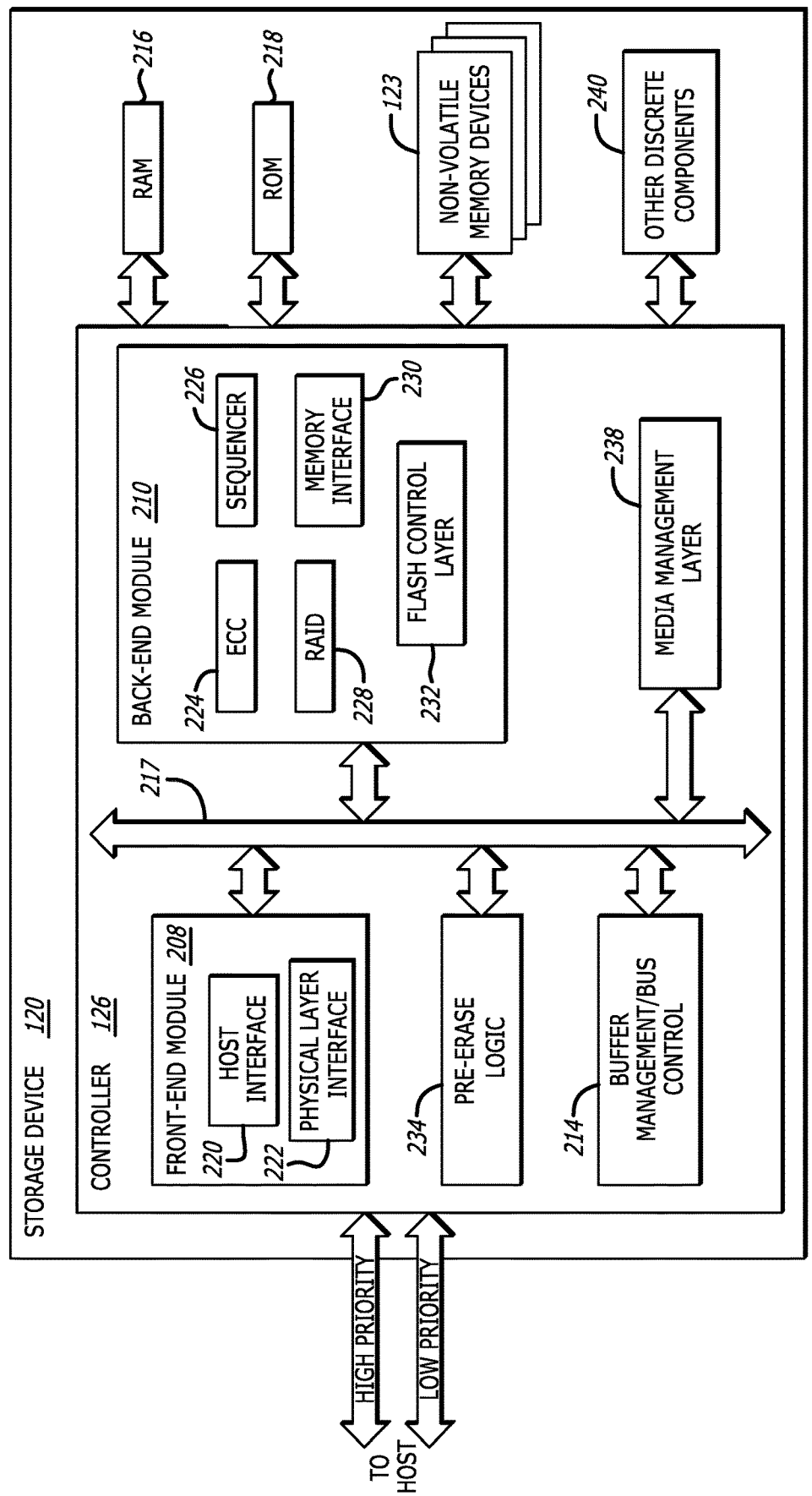
FIG. 2 is a schematic block diagram of a storage device suitable for pre-erase list usage in accordance with an embodiment of the disclosure.

Referring to FIG. 2, a schematic block diagram of a storage device 120 suitable for pre-erase list usage in accordance with an embodiment of the disclosure. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a pre-erase logic 234. In many embodiments, the pre-erase logic 234 can be configured to facilitate the usage of pre-erasure within the storage device. This can include, but is not limited to, determining which memory devices within a memory array are suitable for pre-erasure, initiating pre-erasure in response to a received data invalidation command or addition to a free block list, processing of the block under pre-erasure, assignment of the pre-erased block to the pre-erase list from the free block list, handling scans required upon recovery from an UGSD, and/or providing blocks assigned to the pre-erase list in response to a received write command. Those skilled in the art will recognize that operations within the scope of the pre-erase logic 234 may also be accomplished by one or more other logics which can be under the direction of the pre-erase logic 234. It is also contemplated that the pre-erase logic 234 can also be a part of another logic or hardware/software version of the storage device controller 126.

Figure 3:
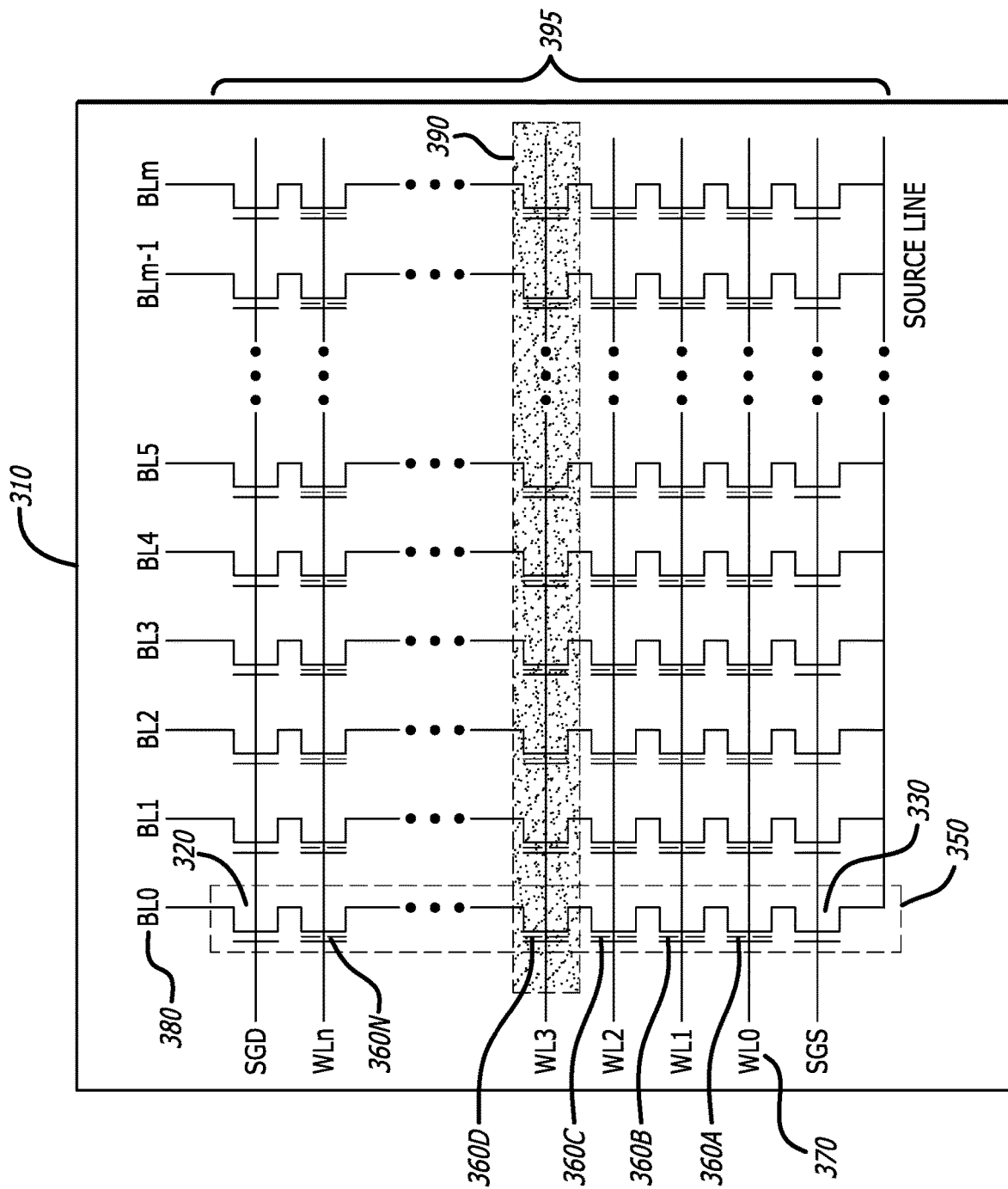
FIG. 3 is a conceptual schematic diagram of a two-dimensional memory array in accordance with an embodiment of the disclosure.

Referring to FIG. 3, a conceptual schematic diagram of a two-dimensional memory array 310 in accordance with an embodiment of the invention is shown. Memory devices, such as those depicted in FIGS. 1 and 2, may be arranged in two or three dimensions, such as a two-dimensional memory array or a three-dimensional memory array. FIG. 3 is a schematic diagram of one example of a two-dimensional memory array 310, such as a 2D or planar NAND memory array. The two-dimensional memory array 310 includes a set of NAND strings 350. Each NAND string 350 comprises a memory cells 360A, 360B, 360C, 360D to 360N. Each NAND string 350 includes a select gate drain transistor (SGD) 320 and a select gate source transistor (SGS) 330. The two-dimensional memory array 310 includes multiple pages 390. Page 390 is accessed by the control gates of the cells of the page connected in common to a word line 370 and each cell accessible via bit lines 380. In other embodiments, the memory cells may be arranged in other configurations. The sum of these groups of pages is considered a block 395. The memory block 395 can also be further arranged and configured with other memory blocks to generate larger memory structures.

This disclosure is not limited to the memory arrays as described in FIG. 3 but can cover all relevant memory structures as understood by one skilled in the art. Other memory arrays are possible, such as memory arrays in a NOR configuration or a memory array made of ReRAM memory cells. Multiple two-dimensional memory arrays or three-dimensional memory arrays (monolithic or non-monolithic) may be formed on separate chips and then packaged together to form a stacked-chip memory device. Multiple memory arrays may be coupled together to form the non-volatile memory of a solid state drive.

Figure 4:
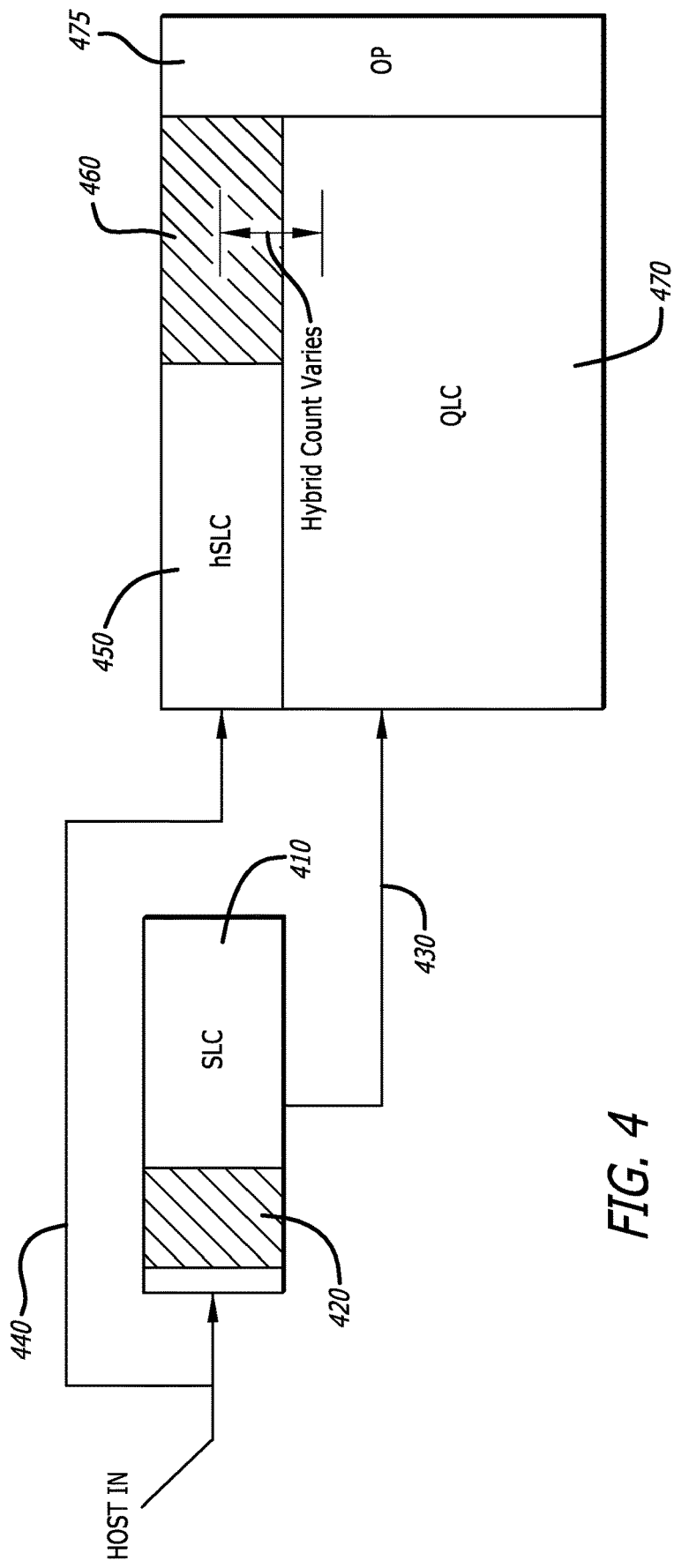
FIG. 4 is a conceptual schematic diagram of data routing between various memory device types in accordance with an embodiment of the disclosure.

Referring to FIG. 4, a conceptual schematic diagram of data routing between various memory device types in accordance with an embodiment of the disclosure is shown. In a number of embodiments, a storage device can comprise a variety of memory device types. The embodiment depicted in FIG. 4 conceptually illustrates a storage device that has a pool of single level cell (SLC) memory devices 410, and a larger pool of memory devices that comprises quad level cell (QLC) memory devices 470, hybrid single level cell (hSLC) memory devices 450, and overprovisioned memory devices 475. As those skilled in the art will recognize, the embodiment depicted in FIG. 4 is depicted for illustrative purposes and may be configured in a variety of different ways within storage devices.

In many embodiments, the storage device is configured to provide enhanced host-side performance by routing host data into the SLC memory devices 410 first. As SLC memory devices often increased read and write performance, it is often beneficial to initially write host data 420 sent to the SLC memory devices 410 before copying or "folding" the host data 420 to the QLC memory devices 470. The hSCL memory devices 450 can be configured to be programmed and/or operate as either SLC or QLC devices as needed. In certain embodiments, the amount of hSLC memory devices and the programming of each of these hSLC memory devices can be dynamically adjusted based on a number of factors including, but not limited to, storage device size, current storage device capacity, current state of SLC memory devices 410, etc.

In a variety of embodiments, the storage device can attempt to fold the host data 420 to the QLC memory devices 470. This can be done directly through a communication channel 430 which can be utilized when storage device usage levels allow for a slower transfer and/or when the use of hSLC is not allowed. In further embodiments, the SLC memory devices 410 may become full, or the transfer of host data 420 to the remaining QLC memory devices 470 needs to be completed faster than a straight transfer. In those embodiments, the host data 420 can be written via a communication channel 440 directly to the hSLC memory devices 450 that are configured to be programmed as SLC memory devices when the SLC memory devices 410 are at capacity.

The utilization of hSLC memory devices 450 can be enhanced through the use of a pre-erasure. Pre-erased hSLC memory devices 460 can reduce the time needed to write/program the memory devices, further enhancing write times when host data is being written to the hSCL memory devices 450. The number of hSLC memory devices 450 that are converted into pre-erased hSLC memory devices 460 can vary based on a variety of factors and/or dynamic thresholds. Once pre-erased, the pre-erased hSLC memory devices 460 can be assigned to a pre-erased list. In certain embodiments, all available hSLC memory devices 450 may converted to pre-erased hSLC memory devices 460.

Figure 5:
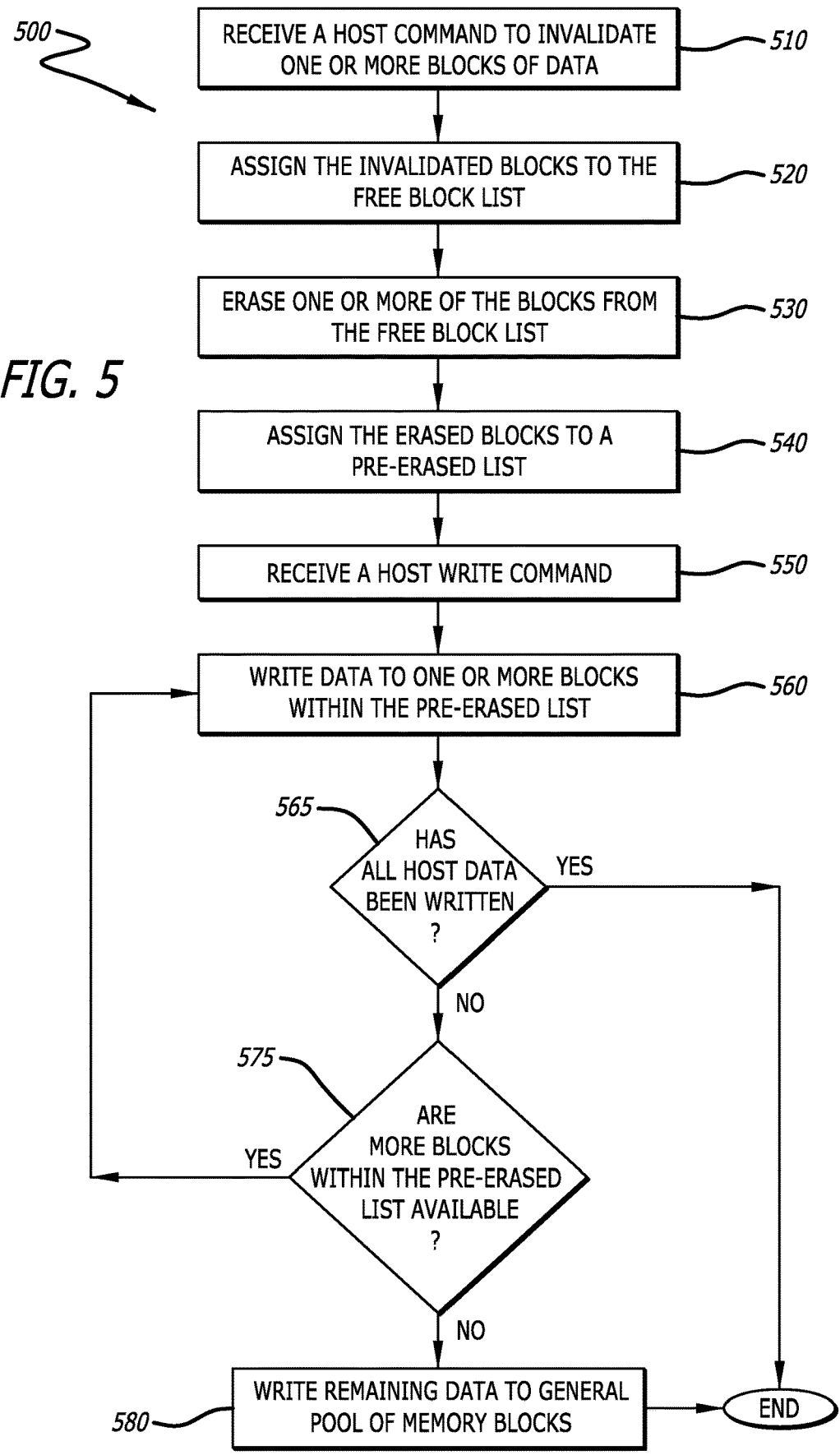
FIG. 5 is a flowchart depicting a process for utilizing a pre-erased list when moving a memory block from a closed to an open state in accordance with an embodiment of the disclosure.

Referring to FIG. 5, a flowchart depicting a process 500 for utilizing a pre-erased list when moving a memory block from a closed to an open state in accordance with an embodiment of the disclosure is shown. In a variety of storage devices, memory devices and memory blocks can be cycled between used and/or totally written with data (closed) to a block that is available for having data written to it (open). In many embodiments, the process 500 can begin when a storage device receives a command to invalidate one or more blocks of data (block 510). Often, the command is received as a host command. Once the command is received, the invalidated memory blocks can be assigned to the free block list (block 520). As those skilled in the art will recognize, a free block list can be utilized to indicate which memory blocks are in an invalidate state, are entirely empty of host data and/or are otherwise free to write data to.

Embodiments that utilize pre-erasure can erase one or more of the blocks assigned to the free block list (block 530). Once erased, the memory blocks can be assigned to a pre-erased list (block 540). The number of blocks from the free blocks list selected for pre-erasure can vary depending on a number of factors including, but not limited to, parameters set within the storage device, the current storage device capacity, and/or the host commands received.

Eventually, a write command will be received (block 550). Often, this is a host write command. The process 500 can write the data to one or more blocks within the pre-erased list (block 560). In a variety of embodiments, the storage device will provide access to pre-erased memory devices only until they are exhausted (i.e., all written to) before providing access to non-erased memory devices. This is reflected in the process 500 by first determining if all of the data has been written (block 565). If all data (often host data) has been written, the process 500 can end. If there is still data to write, the process 500 can determine if more pre-erased blocks are available (block 575).

When there are still pre-erased blocks available, the data can continue to be written to one or more of the pre-erased blocks (block 560). If no pre-erased memory blocks are available, the process 500 can then write the remaining data to a general pool of memory blocks (block 580). While a variety of embodiments described above discuss memory blocks, it is contemplated that other memory structures can be processed similarly including, for example, memory metablocks (i.e., similar blocks across one or more dies within the memory array).

Figure 6:
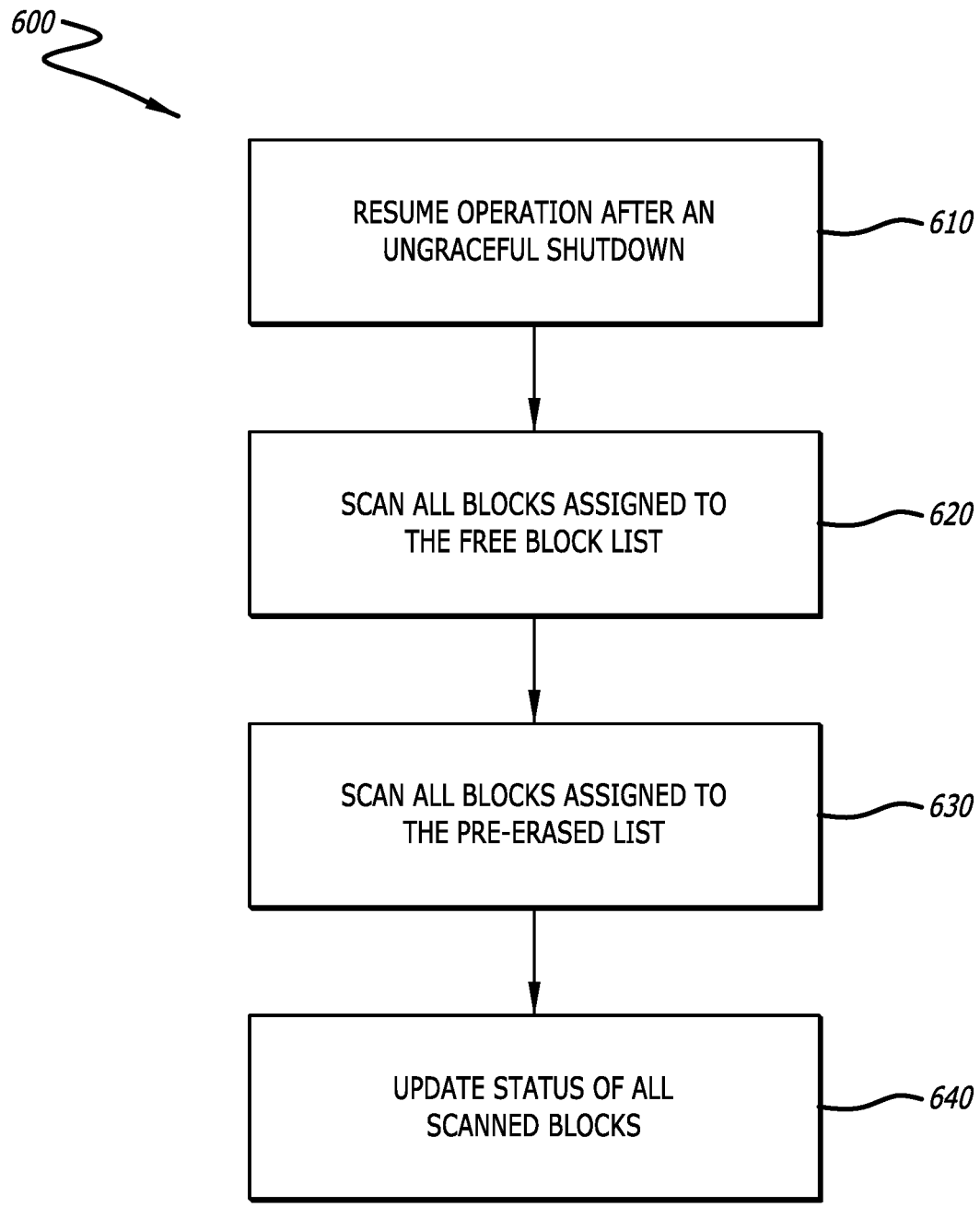
FIG. 6 is a flowchart depicting a high-level process for reconstructing memory blocks after an ungraceful shutdown in accordance with an embodiment of the disclosure.

Referring to FIG. 6, a flowchart depicting a high-level process 600 for reconstructing memory blocks after an ungraceful shutdown in accordance with an embodiment of the disclosure is shown. Storage devices, like all electrical products, can suffer from sudden loses of electricity. The sudden loss of power can lead to situations in which operations can be interrupted. This is often termed as an ungraceful shutdown (UGSD). Within storage devices, UGSDs can lead to instances where memory blocks or other structures are in the middle of being written to, erased, or otherwise transferred between lists. In many embodiments, memory within a storage device is assigned to one or a plurality of lists, wherein each list indicates the current state of the memory. There is often no method of indicating a transitory state between two lists. As such, a memory block or other structure is being operated on in order to transfer between lists, an UGSD can leave the memory block or structure in a state that isn't compatible with either list. Often, the memory subject to this or other transitory states are simply reprocessed before moving to the next state and corresponding list. However, this can present problems as the processing may involve erasure and writing which can lower the overall lifespan of the memory if compounded over time. Thus, there is a need to account for how utilizing pre-erasure lists and pre-erased memory devices will be handled in response to an UGSD.

The process 600 depicted in FIG. 6 is a high-level overview with more detail provided in the following figures. The process 600 can begin when a storage device resumes operation after an ungraceful shutdown (block 610). Once operating, all memory blocks assigned to the free block list can be scanned for their current status (block 620). More detail on this process is discussed in FIG. 7. In many embodiments, once completed, the process 600 can continue to scan all memory blocks assigned to the pre-erased list (block 630). More detail on this process is disclosed in the discussion of FIG. 8. Finally, once all scans are complete, the storage device can update the status of all of the scanned blocks (block 640). Normal operations can continue from this point.

Once again, it is contemplated that other memory structures can be processed similarly including, for example, memory metablocks (i.e., similar blocks across one or more dies within the memory array). Similarly, other embodiments may process the scans of the free blocks and the pre-erased blocks in a different order or even concurrently. Additional operations may also be performed by the storage device to recover from an UGSD that are not explicitly described here but are implied as they are not directly related to the use of a pre-erase list.

Figure 7:
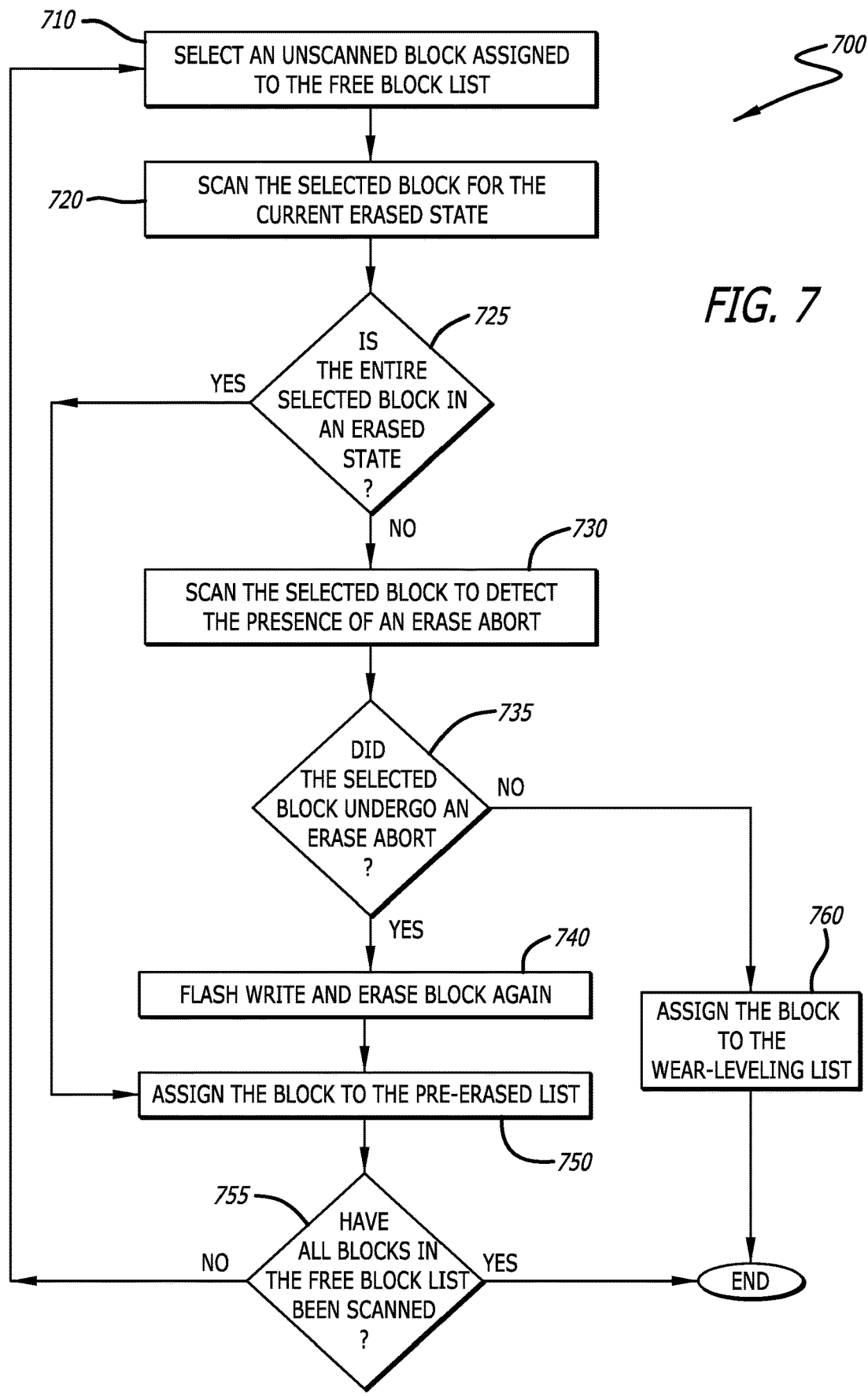
FIG. 7 is a flowchart depicting a process for scanning blocks with a free block list after an ungraceful shutdown in accordance with an embodiment of the disclosure.

Referring to FIG. 7, a flowchart depicting a process 700 for scanning blocks with a free block list after an ungraceful shutdown in accordance with an embodiment of the disclosure is shown. In many embodiments, the process 700 depicted within the embodiment of FIG. 7 can be an expanded version of the corresponding step (620) disclosed in the discussion of FIG. 6. The process 700 can begin by selecting an unscanned block assigned to the free block list (block 710). As discussed above, the free block list comprises assignments or other identification tags pointing to a plurality of memory blocks, metablocks, devices, or other memory structures that were marked as invalidated due to a previously received erase/invalidation command.

Once selected, the block may be scanned to determine the current erased state of the block (block 720). It is possible that, due to an UGSD, the erasure of the memory block was not completed and that only a partial amount of memory cells within the block were erased. The process 700 can determine if the entire block is currently in an erased state (block 725). If the entire block has been erased, then it may be assigned to the pre-erased list (block 750). If only some or none of the block exists in an erased state, then the process 700 can scan the same block to detect the presence of an erase abort (block 730). An erase abort will indicate if an erase operation was interrupted during the UGSD. The process 700 can determine if the selected block did indeed undergo an erase abort (block 735). When an erase abort is not present, the block can be assigned to a wear-leveling list (block 760). A wear-leveling list can process partially written blocks such that the overall program (i.e., write) and erase cycles are kept even across the memory devices of the storage device to increase overall the storage device's useful lifespan.

However, when an erase abort is detected within the selected block, the process 700 can flash write and erase the entire block again (block 740). Once completed, the selected block can be added to the pre-erase list (block 750). Once assigned, the process 700 can determine all blocks have been scanned within the free block list (block 755). When there are still blocks to scan, the process 700 can simply select an unscanned block which has been assigned to the free block list (block 710).

Again, it is contemplated that other memory structures can be processed similarly including, for example, memory metablocks. Similarly, some embodiments may process the scans of the free blocks concurrently or iteratively with the scans of pre-erased blocks. Other methods of tagging or locking memory blocks may be utilized in lieu of scanning if it can be determined that a current state is known, and thus renders a scan unnecessary.

Figure 8:
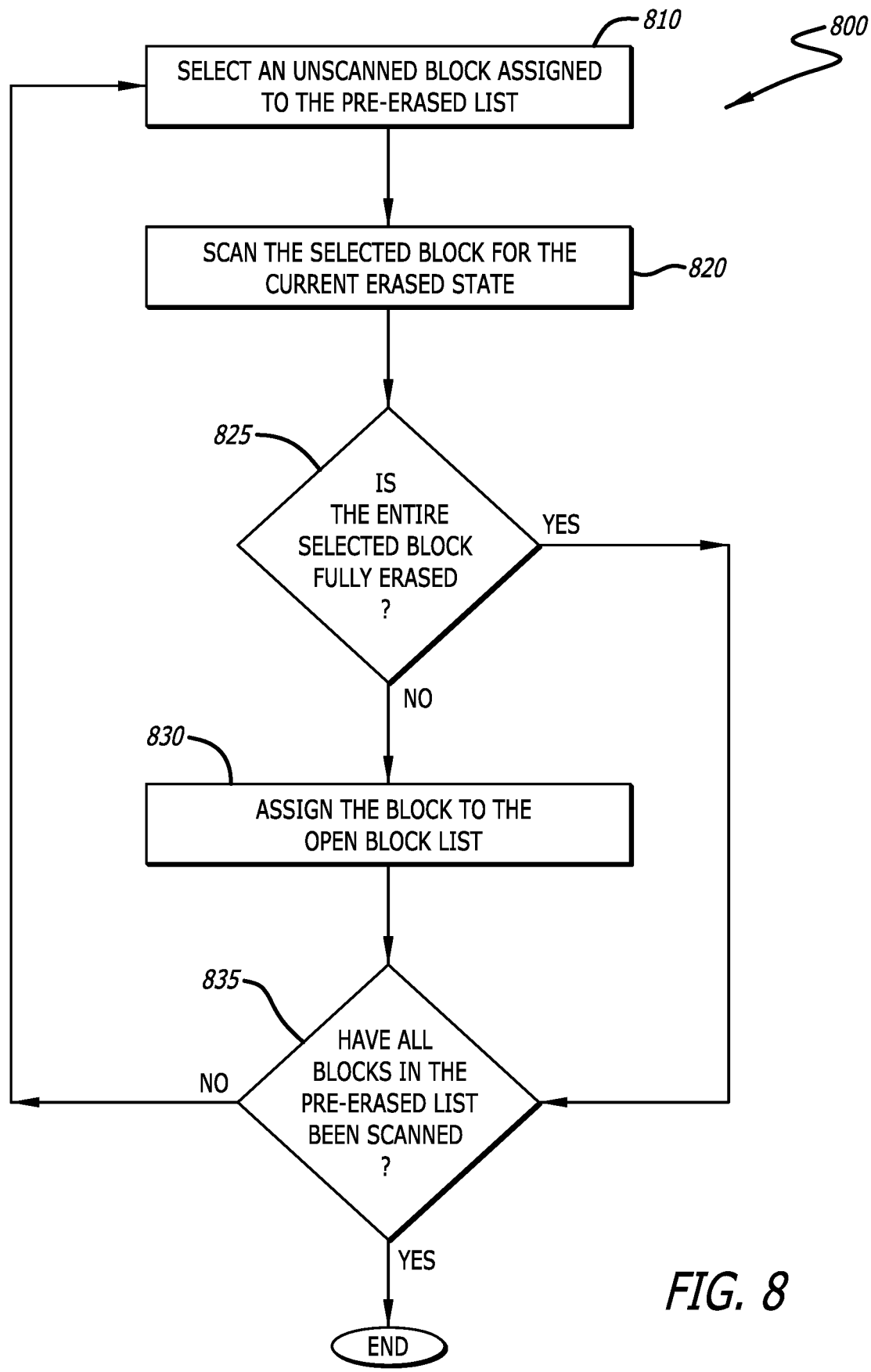
FIG. 8 is a flowchart depicting a process for scanning blocks within a pre-erase list after an ungraceful shutdown in accordance with an embodiment of the disclosure.

Referring to FIG. 8, a flowchart depicting a process 800 for scanning blocks within a pre-erase list after an ungraceful shutdown in accordance with an embodiment of the disclosure is shown. Similar to the discussion of FIG. 7, the process 800 depicted within the embodiment of FIG. 8 can be an expanded version of the corresponding step (630) disclosed in the discussion of FIG. 6. The process 800 can begin in many embodiments by selecting an unscanned block assigned to the pre-erased list (block 810). The current state of the erasure of the block can be checked. This can be accomplished by scanning the selected block for the current erased state (block 820). The process 800 can determine if the selected block is fully erased (block 825). If the selected block is fully erased, it can remain within the pre-erased list and allow the process 800 to determine if all blocks within the pre-erase list have been scanned (block 835). However, when the selected block has not been fully erased, the block can be assigned to the open block list (block 830). In a number of embodiments, the open block list is a list that comprises memory blocks (or assignments, tags, pointers, and the like) indicating what memory blocks are partially written but are not entirely at capacity. Once the selected block has been assigned to the open block list, the process 800 can determine if all blocks within the pre-erased list have been scanned (block 835). When more blocks remain to be scanned, the process 800 can select another unscanned block assigned to the pre-erase list and continue (block 810).

Yet again, it is contemplated that other memory structures can be processed similarly including, for example, memory metablocks. The entire disclosure herein is not limited just to memory blocks. Additionally, some embodiments can process the scans of the pre-erased blocks concurrently or iteratively as new pre-erased blocks are added by other scans being performed. In yet further embodiments, the partially erased blocks may be fully erased instead of added to the open block list.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
a processor;
a memory array comprising:
   a plurality of memory devices wherein the memory devices are configured into a plurality of memory blocks; and
a pre-erase logic configured to:
   locate one or more free memory blocks;
   scan each located free memory block for its current erased state and assign any located free memory blocks that are erased to a pre-erased list;
   scan each remaining unassigned located free memory block for an erase abort condition and assign any located free memory blocks without an erase abort condition into a wear-leveling list;
   erase each remaining unassigned free memory block and assign it into the pre-erased list; and
   provide, in response to the device receiving a write command, one or more erased memory blocks in the pre-erased list for data storage.

2. The device of claim 1, wherein, the one or more free memory blocks are located within a free memory block list.

3. The device of claim 1, wherein the memory devices are further configured into metablocks, and the pre-erase logic locates and erases one or more free memory metablocks prior to adding the one or more erased metablocks to the pre-erased list.

4. The device of claim 1, wherein the location and erasure of the one or more free memory blocks is done prior to receiving a write command.

5. The device of claim 1, wherein the pre-erase logic operates on hybrid single-level cell (hSLC) blocks.

6. The device of claim 5, wherein the number of hSLC blocks pre-erased is dynamically selected.

7. The device of claim 6, wherein the dynamic selection of the number of hSLC block pre-erased is based on a dynamic threshold.

8. The device of claim 7, wherein the dynamic threshold can vary based on the number of currently written memory devices within the memory array.

9. The device of claim 7, wherein the dynamic threshold can vary based on the number of available hSLC memory devices within the memory array.

10. The device of claim 7, wherein the dynamic threshold can vary based on the number of currently written hSLC memory devices within the memory array.

11. The device of claim 7, wherein the dynamic threshold can vary based on the type of memory devices utilized within the memory array.

12. The device of claim 1, wherein, in response to a write command, the pre-erase logic is further configured to
   remove the provided one or more erased memory blocks from the pre-erased list; and
   continue providing erased memory blocks until the pre-erased memory list is empty.

13. A method of pre-erasing memory blocks, comprising:
locating one or more free memory blocks within a memory array of a storage device;
scanning each located free memory block for its current erased state and assigning any located free memory blocks that are erased to a pre-erased list;
scanning each remaining unassigned located free memory block for an erase abort condition and assigning any located free memory block without an erase abort condition into a wear-leveling list;
erasing each remaining unassigned free memory block and assigning it into the pre-erased list; and
providing, in response to the storage device receiving a write command, one or more pre-erased memory blocks in the pre-erased list for data storage.

* * * * *